July 4, 1967　　　R. T. BECKER ET AL　　　3,329,455
CLAMP STRUCTURE
Filed March 29, 1965　　　　　　　　　　2 Sheets-Sheet 1
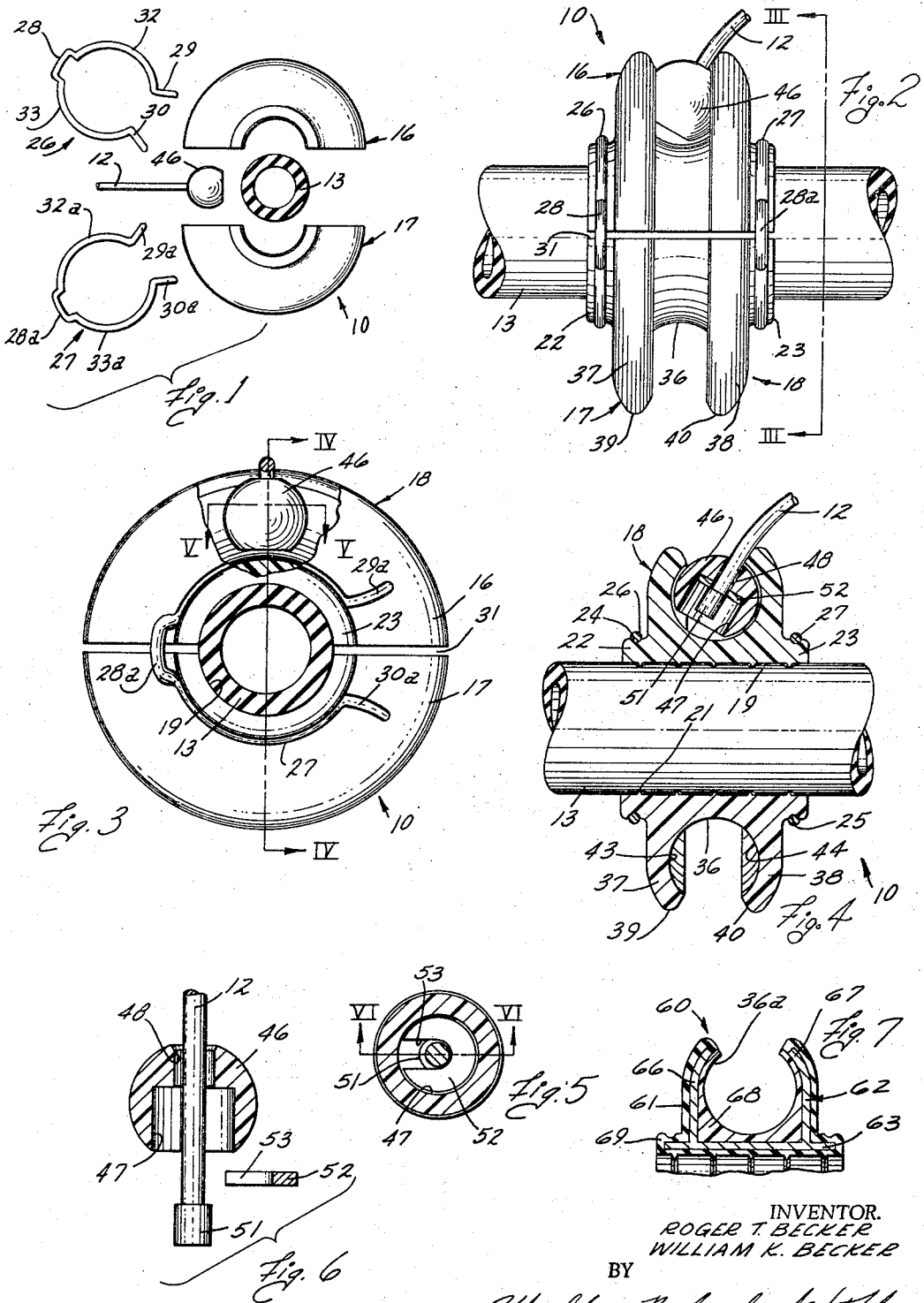
INVENTOR.
ROGER T. BECKER
WILLIAM K. BECKER
BY
Meadham, Blanchard & Flynn
ATTORNEYS

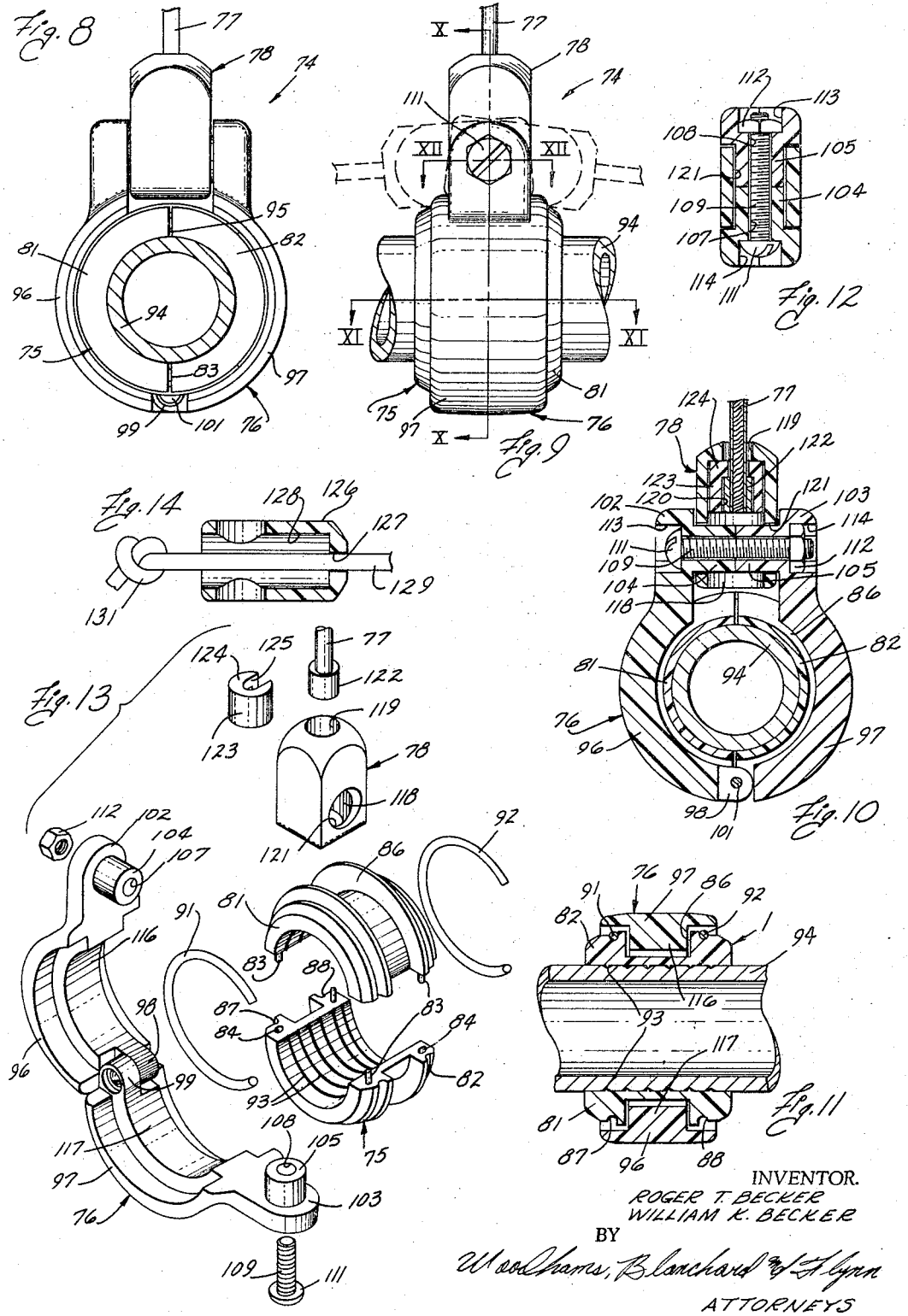

United States Patent Office 3,329,455
Patented July 4, 1967

3,329,455
CLAMP STRUCTURE
Roger T. Becker, Kalamazoo, and William K. Becker, Ross Township, Kalamazoo County, Mich., assignors to Aero-Motive Manufacturing Company, Kalamazoo, Mich., a corporation of Michigan
Filed Mar. 29, 1965, Ser. No. 443,576
5 Claims. (Cl. 287—92)

This invention relates in general to a clamp structure and, more particularly, to a type thereof for effecting a swiveled connection of an elongated cable, such as the cable of a cord reel, to a hose so that the hose can be rotated around its axis without causing the cable to wrap around the hose.

It has been necessary or desirable to connect cables to other objects, such as hoses, for many years and for a variety of reasons. As one example, it is common practice to mount a spring actuated reel on or within a gasoline pump and connect the cable of the reel to the hose so that it will be returned to the pump housing when the use of the hose is completed. In other words, instead of retracting the hose into the pump housing after each use, the cable, only, is retracted into its housing and at least most of the hose is held off the ground by the cable, but on the outside of the pump housing.

The hose engaging clamps, which are connected to the cable for this purpose, have heretofore been constructed so that the cable connection constantly remains on one side of the hose. Accordingly, it is not uncommon for the cable to become wrapped around the hose during use so that either the hose or the cable or both may be subjected to severe twists which contribute to their early failure and obstruct the freedom of their use. Thus, while there are many advantages to the use of a cable reel for this purpose, devices previously available for connecting the end of the cable to the hose have created some disadvantages.

While one particular use of the invention has been discussed in the foregoing paragraphs, it will be apparent that other uses can and will be made thereof.

Accordingly, a primary object of this invention has been the provision of an improved clamp structure for connecting a cable to another object, such as a hose, whereby the cable can pivot around its lengthwise axis with respect to the clamp structure and the end of the cable can move completely around the object to which the clamp structure is attached without wrapping the cable around said object.

A further object of this invention has been the provision of a swiveled clamp structure, as aforesaid, which is relatively easy and inexpensive to manufacture, which is simple to install and operate, and which is capable of long and maintenance-free use.

A further object of this invention has been the provision of a clamp structure, as aforesaid, which firmly, yet releasably, grips the object so that it can be broken loose from the object without damage to the object or the cable, and which can be fabricated largely from nonmetallic parts to minimize sparks, all of which adds materially to the safety factor of the clamp.

A further object of this invention has been the provision of a swiveled clamp structure, as aforesaid, which can be easily adapted to hoses of a wide variety of sizes and shapes, which requires a minimum of parts, which is simple and pleasing in appearance, which does not impair in any way the use or operation of the hose to which it is connected, and which can be adapted for use in existing hose installations without modification of the installations.

Other objects and purposes of this invention will become apparent to persons familiar with this type of equipment upon reading the following descriptive material and examining the accompanying drawings in which:

FIGURE 1 is an exploded, end elevational view of a swiveled clamp structure in association with fragments of a hose and a cable.

FIGURE 2 is a side elevational view of said clamp structure mounted upon a fragment of a hose and connected to a fragment of a cable.

FIGURE 3 is a broken sectional view taken along the line III—III in FIGURE 2.

FIGURE 4 is a sectional view substantially as taken along the line IV—IV in FIGURE 3.

FIGURE 5 is a sectional view taken along the line V—V in FIGURE 3.

FIGURE 6 is an exploded sectional view taken along the line VI—VI in FIGURE 5.

FIGURE 7 is a fragment of FIGURE 4 showing a modified construction.

FIGURE 8 is an end elevational view of a modified, swiveled clamp structure embodying the invention.

FIGURE 9 is a side elevational view of said modified clamp structure.

FIGURE 10 is a sectional view of the modified clamp structure taken along the line X—X in FIGURE 9.

FIGURE 11 is a sectional view taken along the line XI—XI in FIGURE 9.

FIGURE 12 is a sectional view taken along the line XII—XII in FIGURE 9.

FIGURE 13 is an exploded view of the modified clamp structure.

FIGURE 14 discloses an alternate construction for a part of the modified clamp structure.

For convenience in description, the terms "inner," "outer" and derivatives thereof will have reference to the geometric center of the clamp structure or parts thereof embodying the invention. The term "axially" will have reference to a direction parallel with the axis of said clamp structure or the hose which it engages.

General construction

The objects and purposes of the invention, including those set forth above, have been met by providing a clamp structure comprised of a pair of similar, arcuate members which, when arranged in normal operating positions, form an annulus capable of being mounted upon and snugly embracing a hose or similar object. The annulus, which is held together by a pair of arcuate spring clips, has a radially outwardly opening groove which completely encircles the hose.

In one preferred embodiment of the invention, the walls of the groove are arranged to receive and hold a substantially spherical slider for sliding movement along said groove in a circumferential direction. However, the walls of the groove prevent radial movement of the slider out of said groove. The end of a cable can be connected to said slider for rotational and pivotal movement with respect to the annulus.

In another embodiment of the invention, an annular slider is disposed within said groove and includes a radially projecting mechanism for connecting the slider to a cable whereby both rotational and pivotal movement of the cable can be effected. The annulus and the slider in both of the above-mentioned clamp structures are preferably fabricated from, or covered by, a nonmetallic and substantially rigid material to increase the safety factor and to reduce weight without sacrificing strength or freedom of movement.

Detailed description

The clamp structure 10 (FIGURE 2), which illustrates the invention, includes an annulus 18 for connecting one end of an elongated flexible element, such as the cable 12, to an object such as the hose 13. For purposes of illustration, the hose 13 can be connected to a gasoline pump, not shown. However, it will be recognized that the clamp structure 10 may also be used on other objects.

More specifically, the clamp or clamp structure 10 comprises a pair of semicircular or arcuate members 16 and 17 (FIGURES 1, 2 and 3) which, when assembled in their normal position of operation on the hose 13, define the annulus 18 which snugly embraces said hose.

The annulus 18 has a central opening 19, the wall of which has a plurality of spaced and radially inwardly extending ribs 21 (FIGURE 4) for securely gripping the surface of the hose 13 to prevent axial displacement of the hose with respect to the clamp 10. The annulus 18 has a pair of similar necks or annular flanges 22 and 23 of reduced diameter extending from the opposite axial ends thereof. Annular grooves 24 and 25 extend circumferentially around each of the necks 22 and 23, respectively, intermediate the ends thereof.

Substantially circular spring clips 26 and 27 are removably seated in the grooves 24 and 25, respectively, for snugly and resiliently embracing said necks and thereby securing the arcuate members upon the hose 13. The spring clips 26 and 27 are preferably formed from elongated pieces of substantially rigid but resiliently flexible material, such as spring steel. The spring clips 26 and 27 are preferably identical and are preferably of circular cross section corresponding to that of the grooves 24 and 25. The spring clip 26 comprises a spaced pair of arcuate segments 32 and 33 arranged to define a circle having a smaller radius than the radius of the groove 24. The segments 32 and 33 are joined at one end of each by a substantially U-shaped portion 28. The opposite ends of said segments 32 and 33 terminate in divergently curved end portions 29 and 30.

Since segments 32 and 33 are normally separated by distance somewhat less than the diameter of the groove 24, the spring clip 26, when seated in the groove 24 of the neck 22, will urge the arcuate members 16 and 17 toward each other to grip tightly the hose 13.

The spring clip 27, which may be identical to the clip 26 in structure and operation, has segments 32a and 33a, a U-shaped portion 28a and end portions 29a and 30a.

The members 16 and 17 of the annulus 18 are preferably slightly spaced from each other as shown in FIGURE 3 when they are held on the hose 13 by the clips 26 and 27 to insure that said hose will be tightly gripped by and between said arcuate members.

The annulus 18 has an annular and coaxial groove 36 (FIGURE 4) which is defined by the walls 37 and 38, and which opens radially outwardly thereof. The walls 37 and 38 extend radially outwardly and are undercut as indicated at 43 and 44 in a curved manner so that the groove 36 has a cross section defining approximately three-quarters of a circle. The outer ends 39 and 40 of the walls 37 and 38 are preferably rounded to reduce wear on the cable 12, and they are spaced from each other a distance substantially less than the maximum width of the groove 36.

The clamp structure 10 includes a substantially spherical slider 46 (FIGURES 4, 5 and 6) of diameter only slightly less than that of the cross section of the groove 36. The slider 46 is normally snugly but slideably disposed within the groove 36 for movement therealong and for rotation therewithin. The slider 46 is attached by a swivel mechanism to the end of the cable 12. In this particular embodiment, the slider 46 has a cylindrical, coaxial recess 47 in the surface thereof and communicating with a coaxial opening 48 of reduced diameter which penetrates the surface on the opposite side of the slider 46.

The cable 12 (FIGURES 4 and 6) has an enlarged cylindrical knob 51 rigidly affixed to the end thereof in any convenient manner. The diameter of the knob 51 is slightly less than the diameter of the opening 48 for allowing insertion of said knob 51 and cable 31 therethrough and thence through the recess 47. A split ring 52 of diameter slightly smaller than that of the recess 47, but larger than the diameter of the opening 48, is radially slotted at 53. The slot 53 is of sufficient width to receive the cable 12 thereinto, but is substantially narrower than the diameter of the knob 51. The slot 53 is of sufficient radial extent to allow coaxial alignment of the cable 12 and ring 52.

When the slider 46 is affixed to the end of the cable 12, said cable 12 extends loosely through the opening 48 and into the recess 47 where it and the knob 51 are engaged by the ring 52 within the recess 47. Thus, the knob 51 is prevented from sliding out through the opening 48 by the ring 52. Removal of the slider 46 from the end of the cable 12 can be effected by backing the knob 51 and ring 52 out of the recess 47 so that the ring can be removed from the cable 12. By appropriate manipulation of the slider 46, it may be possible to remove the slider from the end of the cable 12 while the slider is in the groove 36.

The slider 46 and annulus 18 may be constructed of any desired, substantially rigid material or materials, preferably capable of providing a minimum of frictional resistance to movement of the slider 46 within the groove 36 while providing a low rate of wear on the coacting surfaces thereof. While in some applications the clamp 10 may be made completely of metal it will be recognized that, when the clamp 10 is used on a gasoline pump hose, nonsparking materials are desirable. Thus, in the particular embodiment shown, the annulus 18 and slider 46 are desirably made of a hard plastic having antifriction properties such as nylon or Teflon (polytetrafluoroethylene).

The clamp 10, hereinabove described, is readily adapted for providing an automatic disconnection between the cable 12 and hose 13 when the tension on the cable exceeds a predetermined value. By this means, it is possible to prevent damage to the hose 13, cable 12 or clamp 10. The quick release feature may be provided in either one or both of two ways. For example, the material and cross section of the walls 37 and 38 may be selected to allow axial deflection or deformation thereof, upon the occurrence of excessive tension in the cable 12, to allow the slider 46 to exit radially from the groove 36. Another method of release is provided by the spring clips 26 and 27 which have a predetermined holding force capable of being overcome by an excessive pull on the cable 12 to allow separation of the members 16 and 17 and, hence, disconnection of clamp 10 from the hose 13.

*Operation*

Assuming the slider 46 to be connected to the cable 12 as described hereinabove and as shown in FIGURES 1 and 4, the clamp 10 is readily assembled by moving the slider 46 circumferentially into an exposed end of the groove 36 in one of the arcuate members 16 or 17. Thereafter, the members 16 and 17 are arranged in opposed relationship around and in contact with the hose 13. The arcuate members 16 and 17 are maintained on the hose 13 by the spring clips 26 and 27 thereon. The spring clips 26 and 27 may be installed upon the annulus 18 by placing the diverging end portions 29 and 30 or 29a and 30a into the grooves 24 and 25, respectively, and then radially moving said clips toward the necks 22 and 23 until they slide into place. The clamp 10 may be removed from the hose 13 simply by reversing the afore-mentioned steps of installation.

The slider 46 normally cannot enter the groove 36 except when the arcuate portions 16 and 17 are separated to expose a cross section of the groove 36. Thus, normal forces of tension on the cable 12 will not displace the slider 46 from the groove 36 when the clamp 10 is in an assembled position.

The clamp 10 permits unlimited rotation of the cable 12 about its own axis both with respect to the slider 46 and with respect to the groove 36. Further, the clamp 10 allows the slider 46 and the attached end of the cable 12 to move completely around the hose 13 by sliding movement of the slider 46 circumferentially along the groove 36. Accordingly, neither the hose 13 nor the cable 12 need become twisted as a result of use or due to their connection to each other.

Because the cable 12 is much thinner than the space between the outer edges 39 and 40 of the walls 37 and 38, the cable 12 can be pivoted around the slider 46 through a wide range of angles without engaging said edges and causing wear. The smooth surfaces on the edge portions 39 and 40 minimize friction and wear on the cable 12 when in contact therewith. Further, the configuration of the portions 39 and 40 prevents sharp bends in the cable 12 when the cable approaches the annulus 18 along a line substantially parallel with the hose 13.

When the slider 46 and annulus 18 are made of nonsparking material, the clamp 10 can be safely used upon a gasoline hose 13, even though the spring clips 26 and 27 and the cable 12 are made of metal. However, the remote possibility of a fire hazard can be completely avoided by coating the outer end of the cable 12 and the spring clips 26 and 27 with a plastic or other nonmetallic material.

Modifications

FIGURE 7 discloses a modified annulus 61 for a clamp structure 60 which differs from the FIGURE 1 embodiment of the invention, discussed hereinabove. The annulus 61 of the hose clamp 60 differs from the annulus 18 in that it is comprised of a plurality of layers. The annulus 61 has a substantially rigid metal core 62 comprising a cylindrical portion 63 having a pair of axially spaced and radially outwardly extending flanges 66. The radially outer ends 67 of the flanges 66 are bent toward but spaced from each other.

The inner surfaces of the flanges 66 and the outer surface of the cylindrical portion 63 are coated with a suitable, low friction material 68, such as nylon or Teflon, which defines a groove 36a substantially similar in cross section to the groove 36. The outwardly facing surfaces of the metal core 62 are preferably coated with a soft and resilient material 69 such as relatively soft rubber, which will not mark the exterior surface of an object brought in contact therewith. Moreover, the rubber coating will prevent a spark hazard. The remaining characteristics of the clamp 60 are substantially similar to those of the clamp 10 and, hence, need no further description.

The modified clamp structure 74 (FIGURES 8 and 9) is comprised of an externally grooved annulus 75 and an annular slider 76, which is rotatably supported upon the annulus 75 and is connected to a cable 77 by a pivot head 78. The annulus 75 and slider 76 are both preferably fabricated from a nonmetallic material, such as nylon.

The annulus 75 is comprised of two, preferably identical and semicylindrical segments 81 and 82 which have cooperating tongues 83 and recesses 84 in their opposing, diametrical surfaces (FIGURE 13) whereby said segments are aligned to form the cylindrical annulus 75. The external surface of the annulus 75 has a relatively large, annular groove 86, which is flanked by a pair of relatively small annular grooves 87 and 88. A pair of arcuate, preferably spring wire clips 91 and 92 are snugly receivable into, and somewhat difficult to remove from, the grooves 87 and 88, respectively, for holding said segments 81 and 82 together whereby they form the annulus 75. The spring clips 91 and 92 necessarily extend through an arc substantially in excess of 180°, such as about 270°.

The segments 81 and 82 are advantageously provided with radially inwardly projecting, annular ribs 93 which grip the hose 94 (FIGURE 11) to oppose relatively axial movement between the hose 94 and the annulus 75. The inside diameter of the annulus 75 is intentionally somewhat smaller than the normal, outside diameter of the hose 94, which the clamp 74 is intended to engage. Thus, positive engagement is ensured even though there may be material variations in the diameter of the hose. Moreover, a clamp 74 designed for use on one size of hose may, under some circumstances, be used on the next larger size of hose.

The ability of the clamp 74 to adjust to hoses of varying diameters can also be accomplished by providing segments which extend through an arc of slightly less than 180°, even though the inside radius of each segment may be the same as the radius of the hose. In either case, a slight space 95 normally exists between the abutting faces of the segments 81 and 82. Thus, a thin instrument, such as one end of a paper clip, can be inserted into the space 95 and pried against a tongue 83 to lift an adjacent end of a spring clip 91 or 92 out of its groove when disassembly of the annulus 75 is desired.

The slider 76 is comprised of a pair of preferably identical and partially arcuate sections 96 and 97, which have similar offset projections 98 and 99 at corresponding ends of each. Said projections 98 and 99 have aligned openings through which the hinge pin 101 extends. A pair of integral flanges 102 and 103 extend substantially radially outwardly from said arcuate sections 96 and 97 at the opposite ends thereof from said projections 98 and 99. A pair of integral cylinders 104 and 105 extend substantially perpendicularly from the opposing faces of said flanges 102 and 103 for engagement when said arcuate sections 96 and 97 substantially define a cylinder having inside dimensions somewhat larger than the corresponding outside dimensions of the annulus 75.

As shown in FIGURE 10, the cylinders 104 and 105 have coaxial openings 107 and 108 through which the shank of the bolt 109 is slideably receivable. The head 111 and a nut 112 are disposed within enlarged portions 113 and 114 in the opposite, outer ends of the openings 107 and 108, respectively.

The arcuate sections 96 and 97 have radially inwardly extending annular ridges 116 and 117 which are spaced from both axial edges thereof and which are slideably and substantially concentrically receivable into the large groove 86 in the annulus 75 when the cylinders 104 and 105 are in their abutting relationship of FIGURE 10. Also, as indicated above, diameters of the inner surfaces of the arcuate sections 96 and 97 are sufficiently larger than the outside diameters of the radially aligned parts on the annulus 75 to allow for variations in the outside diameters of the cylinders 104 and 105 for slideable engagement. Moreover, the tongues 83 on the segments 81 and 82 are of sufficient length to allow for a separation between the segments to accommodate an oversized hose without causing a disengagement of the tongues from the recesses 84.

The pivot head 78 (FIGURE 13), which may have a substantially rectangular outer shape, has a cylindrical opening 118, which extends lengthwise through the head and has a reduced portion 119 at the outer end thereof. A cylindrical opening 121 passes transversely through the cylindrical opening 118 near the inner end thereof. The cylindrical opening 121 is slightly larger than the outside diameters of the cylinders 104 and 105 for slideable reception thereof, whereby the pivot head 78 is rotatably supported upon said cylinders between the flanges 102 and 103. Accordingly, the width of the pivot head 78, lengthwise of the opening 121, is somewhat smaller than the combined length of the cylinders 104 and 105. The cylinders 104 and 105 are located so that the pivot head 78 can swing through an arc of at least 180°, as indicated by broken lines in FIGURE 9, when the clamp structure 74 is in its assembled position of FIGURE 1 without interference by the annulus 75.

In one form of the clamp structure 74 (FIGURE 13) the cable 77 is made from steel wires and is coated with a plastic. A cylindrical sleeve 122 which is slightly smaller in outside diameter than the reduced portion 119 of the opening 118, is swaged or otherwise rigidly secured to the end of the cable. Thus, the sleeve 122 can be inserted downwardly through the reduced portion 119 of opening 118 when connection of the cable 77 to the pivot head 78 is desired.

A cup-shaped holding member 123 (FIGURE 13) has a slot 125 through one side thereof and partially through the bottom wall 124 thereof. The slot 125 is slightly wider than the thickness of the coated cable 77 so that the cable can be inserted into the slot after which the sleeve 122 is moved into the recess 120 in the holding member 123, which then serves as a swivel bearing for the sleeve 122. That is, the holding member 123, which is preferably cylindrical, is rotatably and slideably receivable into the cylindrical opening 118 through the inner end thereof, but it cannot pass through the reduced portion 119 of said opening 118. Likewise, the sleeve 122 can move into the recess 120, but it cannot pass through the slot 125. Thus, as shown in FIGURE 10, the holding member 123 serves to rotatably hold the sleeved end of the cable 77 within the pivot head 78.

When the clamp structure 74 is assembled, the cylinders 104 and 105 block movement of the holding member 123 through the inner end of the opening 118. Also, the cylinders 104 and 105 block displacement of the sleeve 122 through the inner end of the holding member 123. The pivot head 78, and the holding member 123 are preferably, but not necessarily, also fabricated from nylon.

FIGURE 14 illustrates an alternate pivot head 126 in which the reduced portion 127 of the lengthwise opening 128 is only slightly larger than the diameter of the nylon cord 129 extending therethrough. A knot 131 is tied in the end of the cord 129 to hold it within the head 126 because a metal or other sleeve cannot be easily and securely attached to a nylon cord.

Generally speaking, the operation of the modified clamp structure 74 (FIGURE 8) may be the same as the operation of the clamp structure 10, except that the pivot head 78 provides for a somewhat more universal connection between the cable 77 and the hose. On the other hand, the clamp structure 10 is capable of automatic disconnection from the hose when an excessive separating force is applied to them.

Although particular preferred embodiments of the invention have been disclosed above for illustrative purposes, it will be understood that variations or modifications of such disclosure, which lie within the scope of the appended claims, are fully contemplated.

The embodiments of the invention in which an exclusive property or privilege is claimed are defined as follows:

1. A clamp structure for connecting an end of an elongated element to a portion of a hose located between the ends thereof, comprising:
    a pair of substantially semicircular members having nonmetallic outer surfaces and arranged to form an annulus having a central opening therethrough of approximately the same diameter as the portion of the hose, said annulus having a pair of spaced, radially extending and annular wall means defining an outwardly opening, first annular groove, said annulus having annular end portions on opposite axial sides of said first groove;
    grip means on the radially inner side of said annulus engageable with said portion of said hose;
    means defining a pair of outwardly opening, annular grooves in said end portions;
    annular spring means snugly disposed within said pair of grooves for holding said semicircular members tightly against said hose and in the form of said annulus;
    slider means having a nonmetallic external surface and having at least part thereof disposed within said first groove and held therein against substantial radial movement relative to said annulus, said slider means being movable along said first groove completely around said annulus and having a dimension longitudinally of said hose greater than the minimum distance between the peripheral edge portions of said wall means longitudinally of said hose; and
    swivel mechanism connected to the one end of said element and supported within said slider means for rotation of said element around its axis, said element being pivotable around said one end thereof in an infinite number of planes substantially including said axis of said hose without bending said element.

2. A clamp structure according to claim 1 wherein said wall means forming said first groove defines an arc of between 200° and 300° of a circle located substantially in a plane including the central axis of said annulus;
    wherein said element has enlargement means on said one end; and
    wherein said slider has a substantially spherical, nonmetallic shell with an opening extending diametrically therethrough, said opening having a portion of relatively small diameter through which said element is slidably received and a portion of relatively large diameter in which said enlargement means is disposed.

3. A clamp structure according to claim 1 wherein said slider means comprises:
    a pair of hingedly connected annular sections arranged in positions loosely encircling substantially more than one-half of said annulus and haviing radially inwardly projecting ridge means loosely and slidably received within said groove;
    a pair of integral flanges connected to and extending substantially radially outwardly from said annular sections;
    a pair of hollow cylinders secured to said flanges and coaxially engageable with each other when said annular sections are in said positions;
    head means pivotally mounted upon said cylinders and connected to said end of said elongated element; and
    connecting means extending through said cylinders and holding said annular sections in said positions and with respect to each other.

4. A structure according to claim 1 wherein said semicircular members have cooperating tongue and recess means on their opposing faces for positioning the same in said annulus; and
    wherein said spring means comprises a pair of annular metal clips extending substantially more than half way around the annulus.

5. A structure according to claim 3 wherein said head means has a lengthwise opening therethrough with a reduced portion at one end through which said element is slideably and snugly received, said head means having a pivot opening transverse of said lengthwise opening into which said cylinders are slideably and rotatably received; and
    wherein said element has enlargement means thereon disposed within said lengthwise opening, said enlargement means being larger than the diameter of the reduced portion of said lengthwise opening.

References Cited

UNITED STATES PATENTS

| | | | |
|---|---|---|---|
| 2,435,081 | 1/1948 | Howard | 119—121 |
| 2,962,245 | 11/1960 | Molzan et al. | |
| 3,006,674 | 10/1961 | Becker | 287—92 |
| 3,107,110 | 10/1963 | Dunklee et al. | 287—92 |
| 3,143,367 | 8/1964 | MacDonnell | 287—92 |

FOREIGN PATENTS 1,300,135   6/1962   France.

WILLIAM FELDMAN, *Primary Examiner.*

E. SIMONSEN, *Assistant Examiner.*